United States Patent
Ganguli et al.

(10) Patent No.: US 11,325,779 B2
(45) Date of Patent: May 10, 2022

(54) SMART LOCKER AUTOMATED TRANSFER SYSTEM AND METHOD

(71) Applicant: Great Wall Motor Company Limited, Baoding (CN)

(72) Inventors: Subhabrata Ganguli, Northville, MI (US); Avaneesh Srinivasa, Southfield, MI (US); Namrita Madhusoodanan, Farmington Hills, MI (US); Mark Crawford, Van Buren Township, MI (US)

(73) Assignee: Great Wall Motor Company Limited, Baoding (CN)

( * ) Notice: Subject to any disclaimer, the term of this patent is extended or adjusted under 35 U.S.C. 154(b) by 275 days.

(21) Appl. No.: 16/862,683

(22) Filed: Apr. 30, 2020

(65) Prior Publication Data

US 2021/0339952 A1 Nov. 4, 2021

(51) Int. Cl.
| | |
|---|---|
| *B65G 1/04* | (2006.01) |
| *B65G 43/08* | (2006.01) |
| *G06Q 10/08* | (2012.01) |
| *B65G 1/137* | (2006.01) |
| *B25J 5/00* | (2006.01) |
| *B25J 13/00* | (2006.01) |

(52) U.S. Cl.
CPC ............ *B65G 1/0492* (2013.01); *B25J 5/007* (2013.01); *B25J 13/006* (2013.01); *B65G 1/1373* (2013.01); *B65G 43/08* (2013.01); *G06Q 10/087* (2013.01); *G06Q 10/0833* (2013.01); *G06Q 10/0836* (2013.01); *B65G 2201/02* (2013.01)

(58) Field of Classification Search
CPC ........ B65G 1/10; B65G 1/026; B65G 1/0435; B65G 1/0428; B65G 1/0492; B65G 1/0414; G06Q 10/087; G06Q 10/0836; G06Q 10/0837; G06Q 10/0833
See application file for complete search history.

(56) References Cited

U.S. PATENT DOCUMENTS

| | | | | |
|---|---|---|---|---|
| 11,270,251 | B2 * | 3/2022 | Fee | G06Q 30/04 |
| 2017/0036859 | A1 * | 2/2017 | Lopes Ribeiro | B65G 1/137 |
| 2018/0244469 | A1 * | 8/2018 | Testa | G07F 11/165 |
| 2019/0168392 | A1 * | 6/2019 | Väin | B25J 11/00 |
| 2020/0342392 | A1 * | 10/2020 | Godwin | B65G 1/1378 |
| 2021/0200210 | A1 * | 7/2021 | Gil | G05D 1/0088 |
| 2021/0330111 | A1 * | 10/2021 | Nowinski | G07F 17/12 |

* cited by examiner

*Primary Examiner* — Kaitlin S Joerger
(74) *Attorney, Agent, or Firm* — Young Basile Hanlon & MacFarlane, P.C.

(57) ABSTRACT

A smart locker automated transfer system includes one or more lockers, a transfer system, and an autonomous delivery robot. Each locker includes a retractable base plate configured to hold the package. The transfer system may include a rack and rail system, one or more conveyor belts, or both. The autonomous delivery robot may be configured to receive the package from the transfer system. The autonomous delivery robot may be configured to deliver the package to a destination.

20 Claims, 12 Drawing Sheets

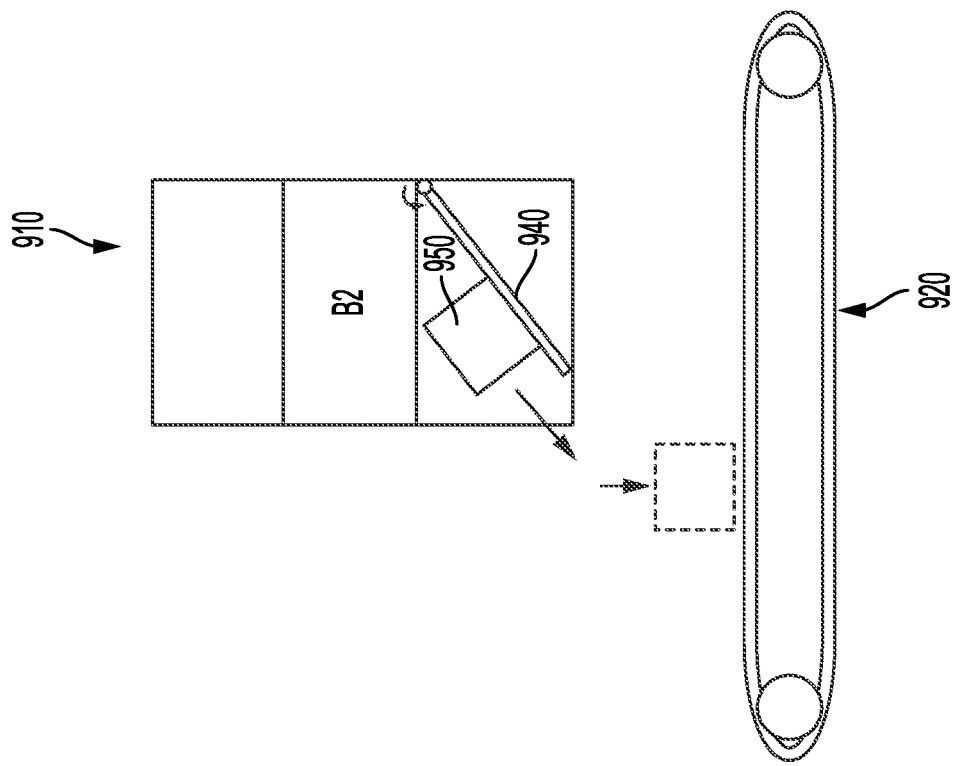
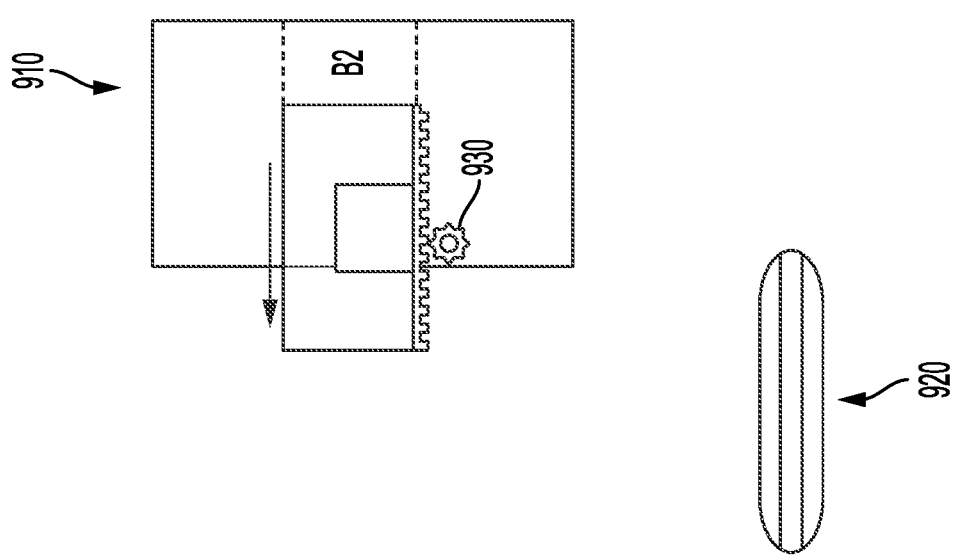
FIG. 9B
FIG. 9A

SMART LOCKER AUTOMATED TRANSFER SYSTEM AND METHOD

TECHNICAL FIELD

This disclosure relates to smart locker systems. More specifically, this disclosure relates to automated smart locker systems and methods using autonomous vehicles.

BACKGROUND

With the recent growth in e-commerce, autonomous package delivery for the last mile has been receiving greater attention. Many organizations are investing heavily in autonomous package delivery. A typical approach for deployment of package delivery robots is based on a human operator manually loading the robot and manually initiating the autonomous operation. This approach may be observed in the delivery of food or grocery items. Another typical approach may implement a delivery robot from a delivery van. Both of these approaches include involvement of a human operator. New approaches are needed where the delivery robots can be deployed so that packages may be autonomously delivered without human intervention for the last mile.

SUMMARY

Disclosed herein are examples of methods and systems for autonomous smart locker delivery. In an aspect, a smart locker automated transfer system may include one or more lockers, a transfer system, and an autonomous delivery robot. Each locker may include a first side configured for loading a package, a second side configured for unloading the package, and a retractable base plate configured to hold the package. The transfer system may include at least two sets of parallel bars configured to move horizontally along a plurality of guide rails to align with the locker. The transfer system may include a rail base plate that is configured to receive the package from the retractable base plate. The rail base plate may be attached to the at least two sets of parallel bars via a hydraulic mechanism. The hydraulic mechanism may be configured to align the rail base plate vertically with the locker. The autonomous delivery robot may be configured to receive the package from the rail base plate. The autonomous delivery robot may be configured to deliver the package to a destination.

Another aspect may include a smart locker automated transfer system that includes one or more lockers, a transfer system, and an autonomous delivery robot. Each locker may include a first side configured for loading a package, a second side configure for unloading the package, and a retractable smart locker configured to hold the package. The transfer system may include one or more conveyor belts. The autonomous delivery robot may be configured to receive the package from the conveyor belt. The autonomous delivery robot may be configured to deliver the package to a destination.

In one or more aspects, the retractable base plate may include a first rack and pinion mechanism. The first rack and pinion mechanism may be configured to extend the retractable base plate from the locker and retract the retractable base plate into the locker. In one or more aspects, the retractable base plate may include a second rack and pinion mechanism configured to transfer the package to the rail base plate. In one or more aspects, the second rack and pinion mechanism may comprise a second set of pinions. The second set of pinions may be positioned in a perpendicular direction along a same plane relative to the first rack and pinion mechanism.

In one or more aspects, the smart locker automated transfer system may include a cloud management system. The cloud management system may be configured to receive a package pickup request. The cloud management system may be configured to transmit a locker identifier (ID) to the transfer system. The locker ID may indicate a locker associated with the package pickup request. In one or more aspects, the cloud management system may be configured to determine an estimated delivery time and transmit the estimated delivery time to a user, for example, a customer. The estimated delivery time may be determined based on a user location, traffic conditions, weather conditions, a time to load the autonomous delivery robot, or any combination thereof. In one or more aspects, the cloud management system may be configured to transmit the delivery destination to the autonomous delivery robot. In one or more aspects, the cloud management system may be configured to transmit information associated with a package pickup to the autonomous delivery robot.

In one or more aspects, the transfer system may be configured to receive the locker ID. The locker ID may indicate the locker associated with the package pickup request. The transfer system may be configured to align the rail mechanism with the indicated locker in response to receiving the locker ID.

In one or more aspects, the locker may be configured to receive an unlock request from the cloud management system. The locker may be configured to open the second side in response to the unlock request. The locker may be configured to extend the retractable base plate to transfer the package. The locker may be configured to retract the base plate based on a confirmation of a successful transfer to the rail base plate. In one or more aspects, the rail base plate may be configured to transfer the package to the autonomous delivery robot.

In one or more aspects, the autonomous delivery robot may be configured to receive a delivery destination and information associated with a package pickup. In one or more aspects, the autonomous delivery robot may be configured to park in a docking area based on the information associated with the package pickup. In one or more aspects, the autonomous delivery robot may be configured to receive the package from the rail base plate and traverse to the delivery destination. In one or more aspects, the autonomous delivery robot may be configured to transmit an authentication request to a customer. In one or more aspects, the autonomous delivery robot may be configured to receive an authentication response from the customer. In one or more aspects, if the authentication response matches an identifier associated with the package, the autonomous delivery robot may be configured to deliver the package to the customer. In one or more aspects, delivering the package to the customer may include unlocking the storage compartment door for package retrieval.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 9A is a diagram of a side view an example of a package transfer using a smart locker automated transfer system with a conveyor belt mechanism in accordance with embodiments of this disclosure.

FIG. 9B is a diagram of a rear view of an example of a package transfer using a smart locker automated transfer system with a conveyor belt mechanism in accordance with embodiments of this disclosure.

DETAILED DESCRIPTION

Figure 1:
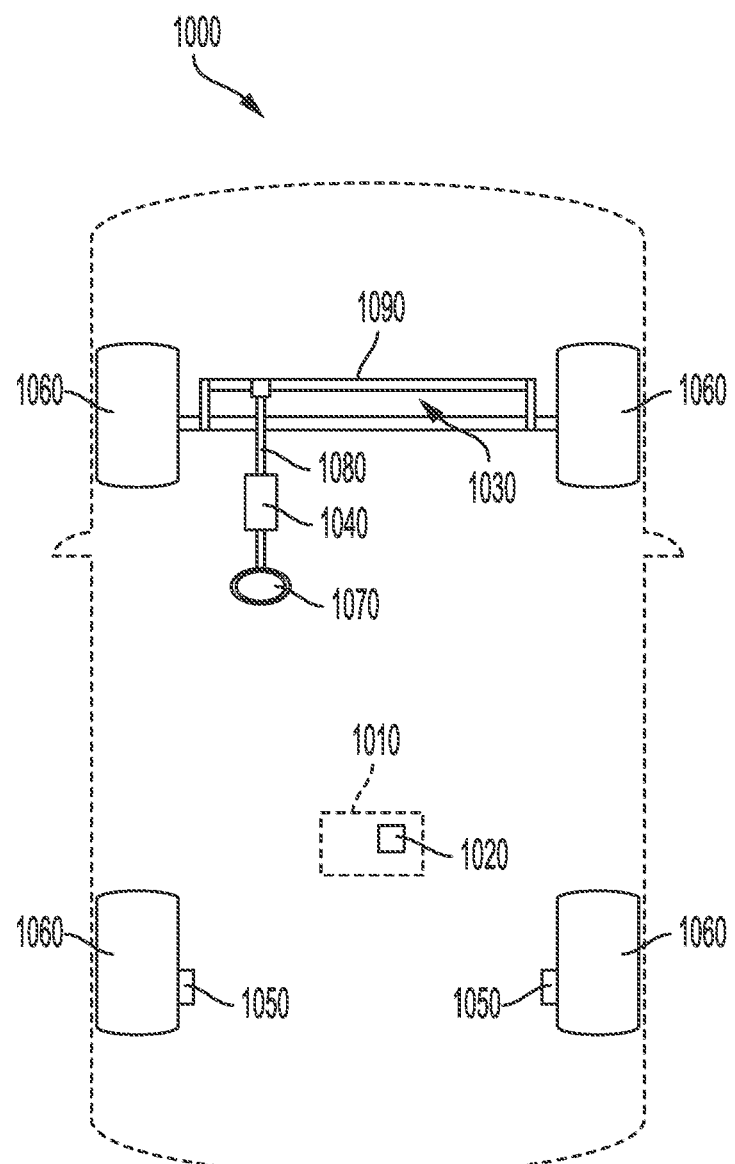
FIG. 1 is a diagram of an example of a vehicle in accordance with embodiments of this disclosure.

The embodiments disclosed herein include smart locker automated transfer systems and methods that may function in conjunction with other systems to enable a customer to place an online order and receive their order via an autonomous delivery robot. In an example, a customer may place an online purchase request using an application on a personal device. The seller may be notified of this request through a cloud management system. The seller may procure the requested items of the order, package the items, and then ship the package to an appointed smart locker service provider in the destination area of the customer. The smart locker service provider staff may manually load the package from the seller to the correct smart locker. In some implementations, an autonomous robot may be used to load the package from the seller to the correct smart locker.

The last mile delivery to the customer may be performed using an autonomous delivery robot. Once the requested package is safely stored in the smart locker, the autonomous delivery robot assigned to deliver the package is sent to the smart locker location. The autonomous delivery robot is configured to park at a designated area near the smart locker system and opens its storage compartment. In the embodiments disclosed herein, the smart locker automated transfer system may identify which locker contains the package that is to be delivered to the customer. The package may then be autonomously retrieved using the transfer systems disclosed herein and transported to the autonomous delivery robot. The autonomous delivery robot may receive the package and autonomously travel to the package destination. Upon arrival at the package destination, the autonomous delivery robot may notify the customer of the arrival of the autonomous delivery robot. The autonomous delivery robot may then authenticate the customer using a secure code that is shared with the customer. Once the customer has been authenticated, the autonomous delivery robot may unlock the storage compartment for package retrieval.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration.

Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle 1000 in accordance with embodiments of this disclosure. The vehicle 1000 may be an autonomous vehicle (AV) or a semi-autonomous vehicle including, for example, a delivery robot or a miniature delivery robot. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
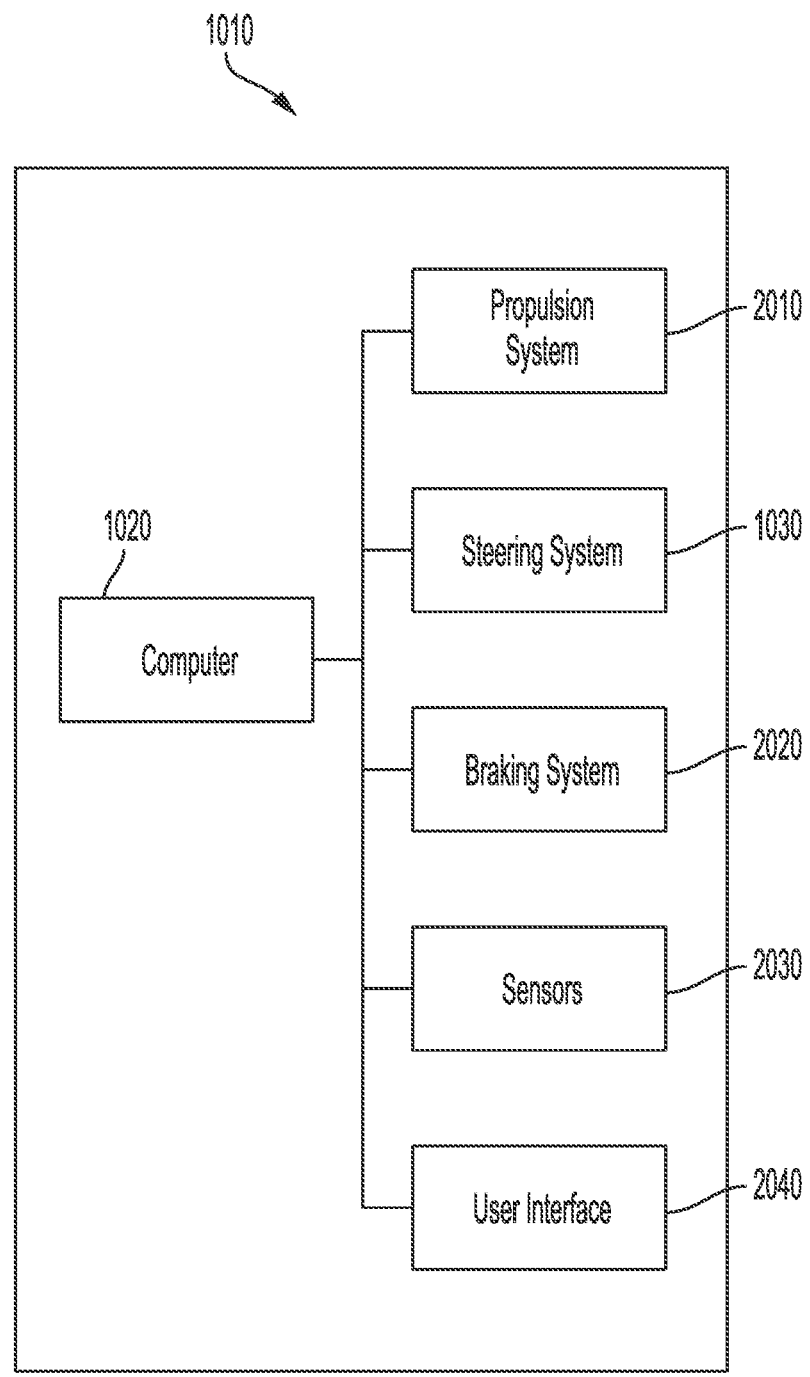
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning off the road wheels 1060. The steering column 1080 may be coupled to the steering rack 1090 via a rack-and-pinion, that is, gear meshing between the pinion gear and rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, a ring laser, or fiber-optic gyroscopes; inertial measurements units (IMU); and magnetometers. The sensors 2030 may detect the external world, for example, radar sensors, scanning laser rangefinders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
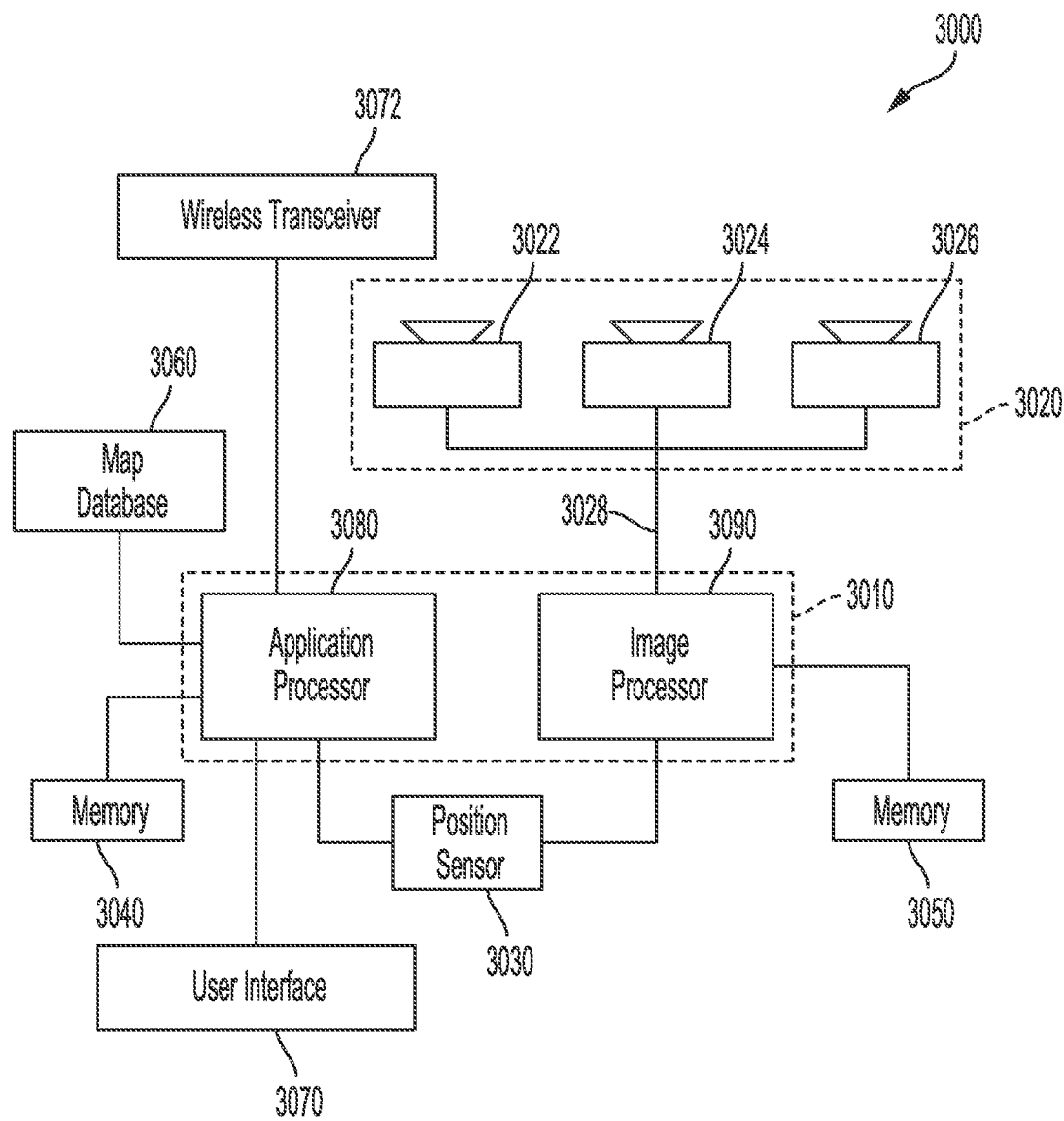
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, an image capture device 3024, an image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 3080 and/or image processor 3090 may include any type of single or multi-core processor, mobile device microcontroller, the central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in the processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software. The memory may comprise any number of random access memories, read-only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of the vehicle control system 3000. These memory units may include various databases and image processing software, as well as a trained system, such as a neural network, or a deep neural network, for example. The memory units 3040, 3050 may include random access memory, read-only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of the vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from LIDAR or stereo processing of two or more images) of the environment may be processed together with position information, such as a GPS coordinate, vehicle's ego-motion, etc. to determine a current location of the vehicle relative to the known landmarks, and refine the vehicle location.

User interface 3070 may include any device suitable for providing information to or for receiving inputs from one or more users of the vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to the vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items but also descriptors relating to those items, including, for example, names associated with any of the stored features. In some embodiments, map database 3060 may be physically located with other components of the vehicle control system 3000. Alternatively or additionally, map database 3060 or a portion thereof may be located remotely with respect to other components of the vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information or related information received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
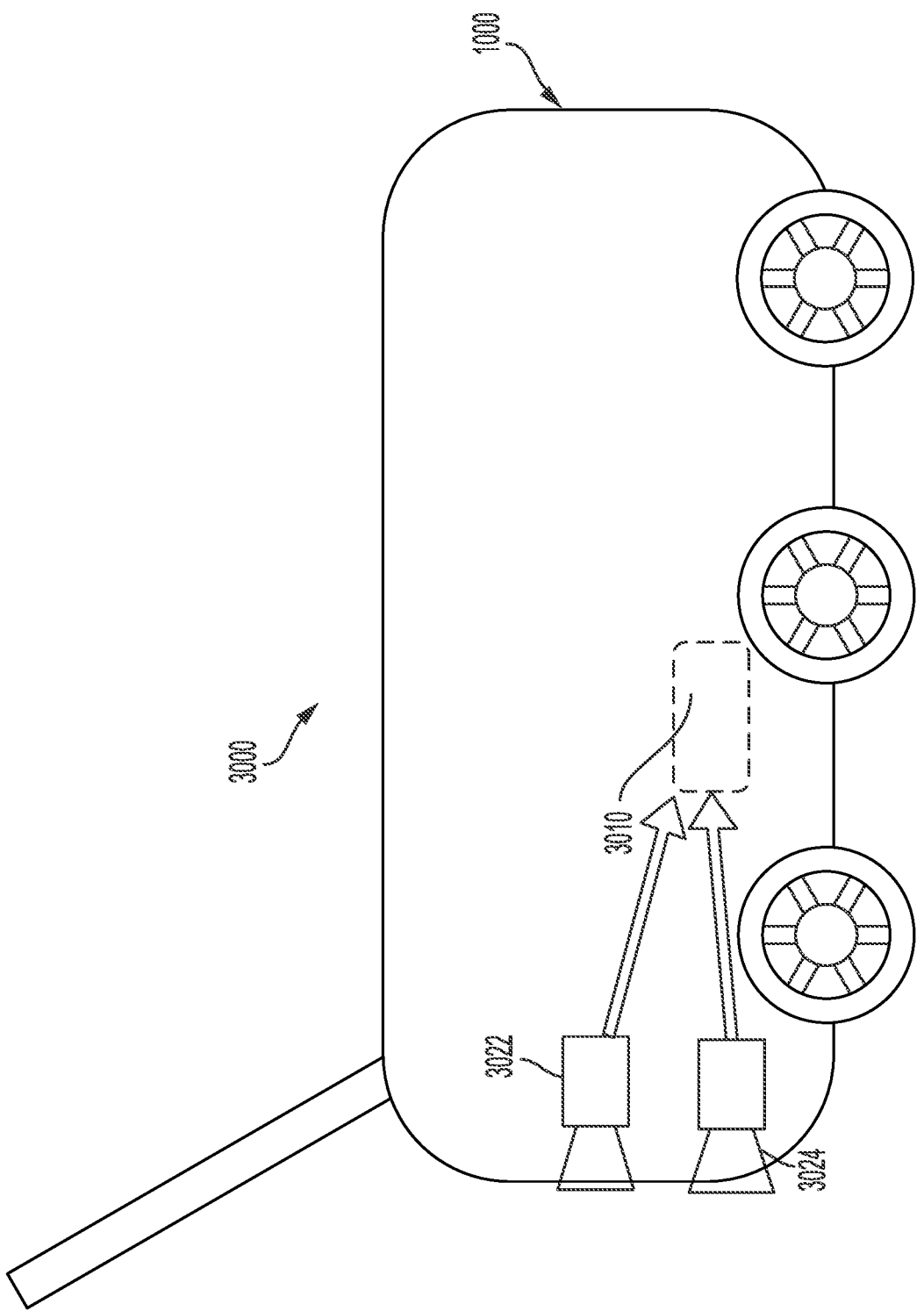
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of the vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an automated driving system imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of the vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may transmit and/or receive data over one or more networks (e.g., cellular networks, the Internet, etc.). For example, wireless transceiver 3072 may upload data collected by the vehicle control system 3000 to one or more servers, and download data from the one or more servers. Via wireless transceiver 3072, vehicle control system 3000 may receive, for example, periodic or on-demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by a user via, for example, wireless transceiver 3072, be initialized by factory default settings, or by data received by wireless transceiver 3072.

Figure 5:
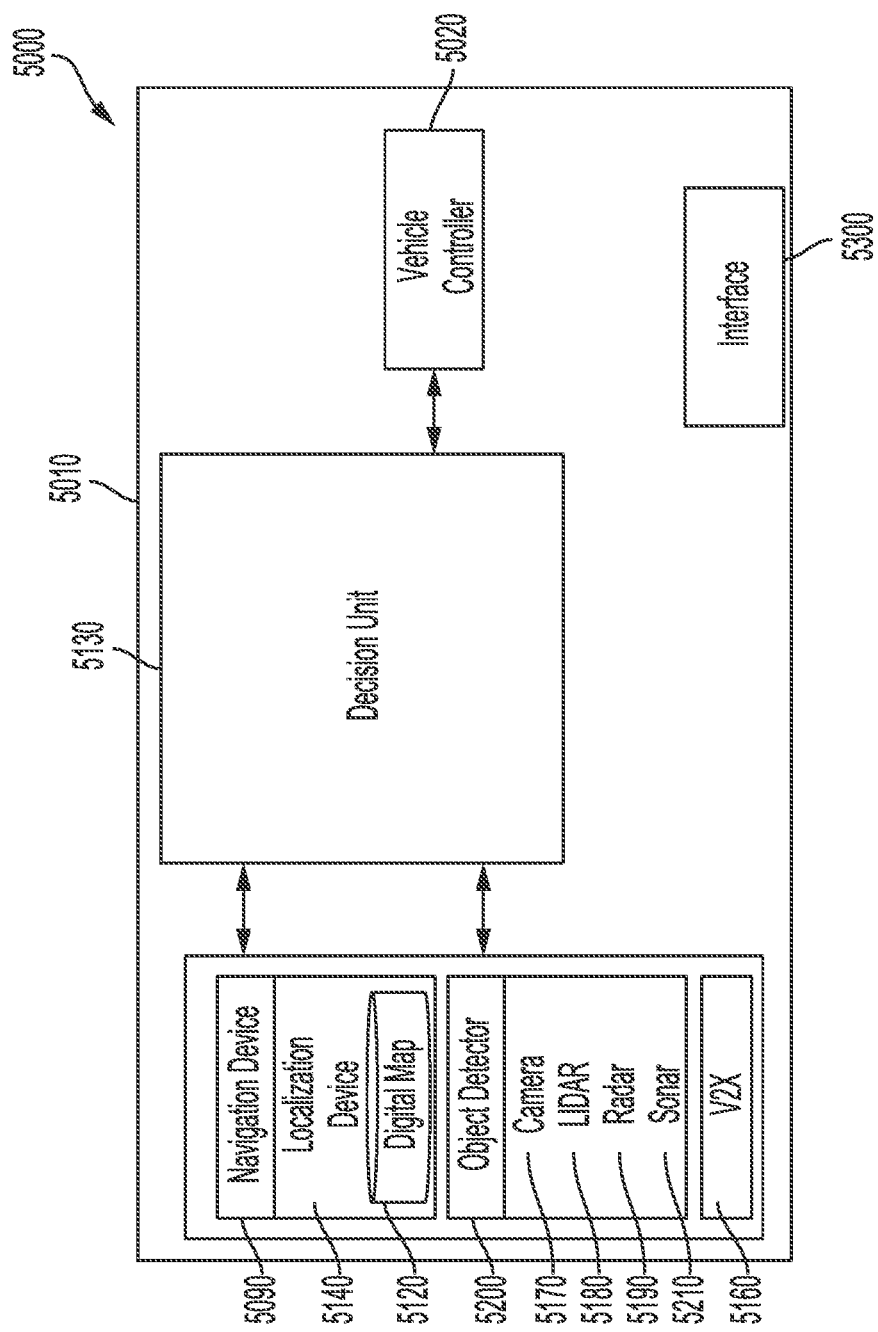
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

The vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140. A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part provided by way of V2I communications, V2V communications, vehicle-to-pedestrian (V2P) communications, or a combination thereof, which may generically be labeled as V2X communications 5160. The navigation device 5090, localization device 5140, or both may include a processor(s) such as a microprocessor or other control circuitry such as analog circuitry, digital circuitry, or both, including an application specific integrated circuit (ASIC) for processing data. The navigation device 5090, localization device 5140, or both may include a memory, including a non-volatile memory, such as electrically erasable programmable read-only memory (EEPROM) for storing one or more routines, thresholds, captured data, or a combination thereof.

In some implementations, an object detector 5200 may include the sonar unit 5210, the camera 5170, the LIDAR unit 5180, and the radar unit 5190. The object detector 5200 may be used to detect the relative location of another entity and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include one or more processors such as a microprocessor or other control circuitry such as analog circuitry, digital circuitry, or both, including an application specific integrated circuit (ASIC) for processing data. The decision unit 5130 may include a memory, including a non-volatile memory, such as electrically erasable programmable read-only memory (EEPROM) for storing one or more routines, thresholds, captured data, or a combination thereof. The decision unit 5130 may determine or control route or path planning, local driving behavior, and trajectory planning for the host vehicle 5010. The host vehicle 5010 includes an interface 5300. The interface 5300 is configured to connect to a removable platform of the configurable interior.

The vehicle system architecture 5000 includes a vehicle controller or trajectory tracker 5020 that is in communication with the decision unit 5130. The vehicle controller 5020 may execute a defined geometric path by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including a non-volatile memory, such as electrically erasable programmable read-only memory (EEPROM) for storing one or more routines, thresholds, captured data, or a combination thereof.

The host vehicle 5010 may operate in an automated mode where a human operator is not needed to operate the vehicle 5010. In the automated mode, the vehicle control system 5000 (using, for example, the vehicle controller 5020, the decision unit 5130, navigation device 5090, the object detector 5200 and the other described sensors and devices) autonomously controls the vehicle 5010. Alternatively, the host vehicle may operate in a manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6B:
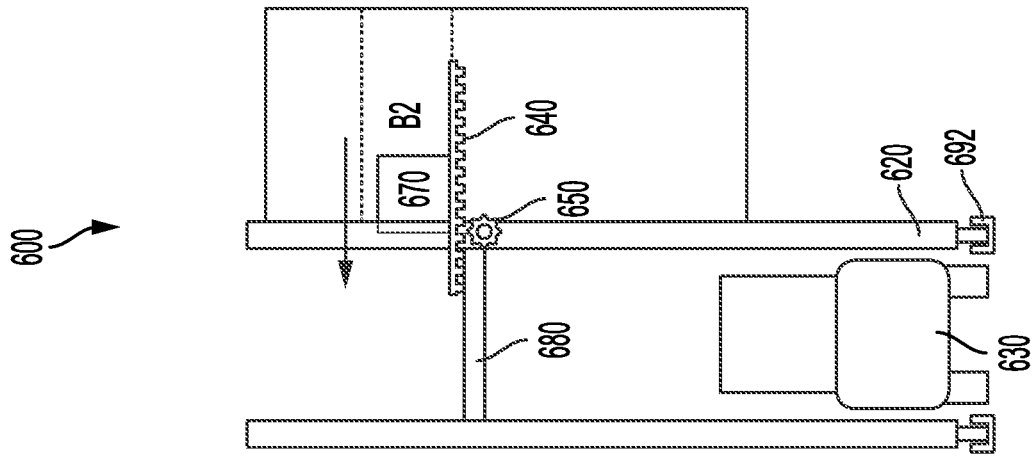
FIGS. 6A-6D are diagrams of rear and side views of an example of a smart locker automated transfer system using a rack and rail mechanism in accordance with embodiments of this disclosure.
Figure 6A:
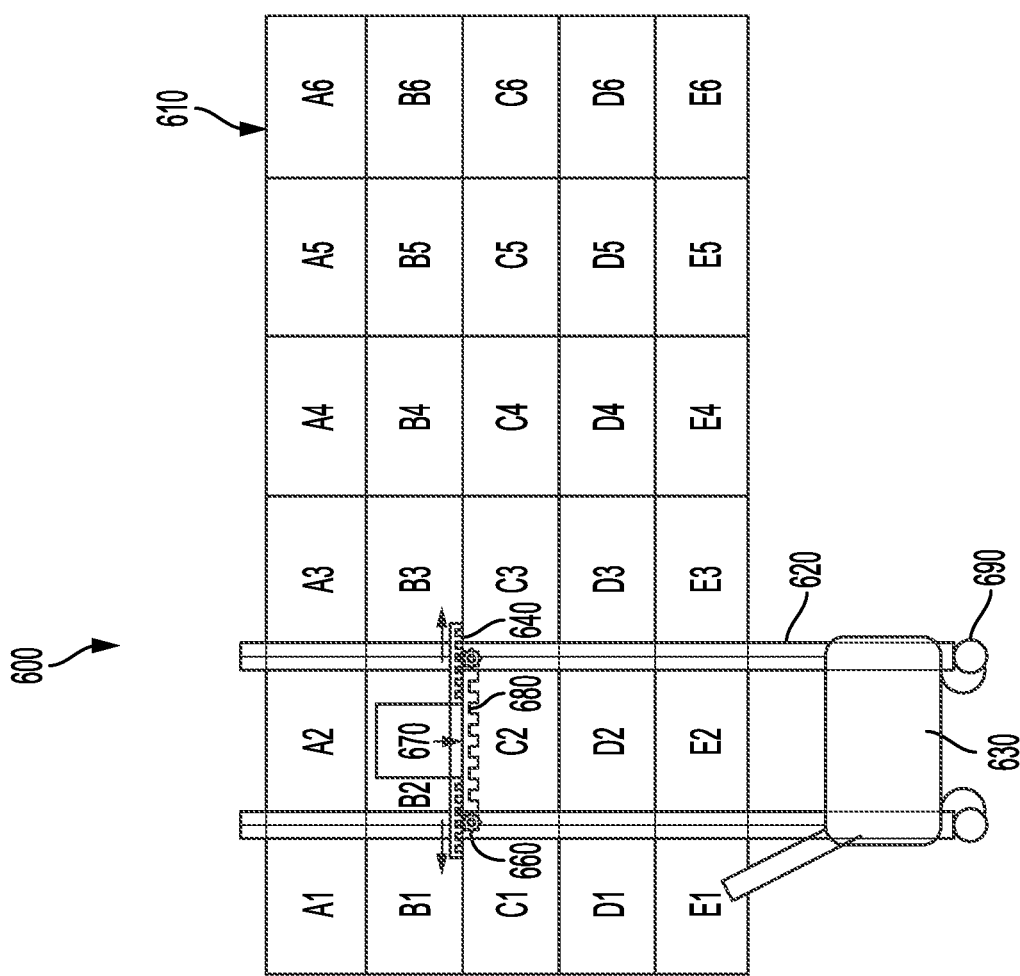
Figure 6D:
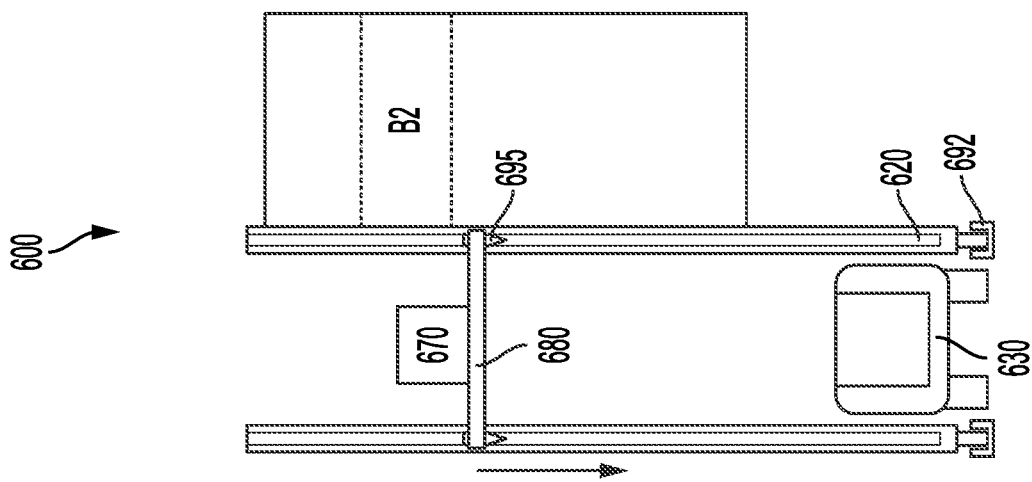
Figure 6C:
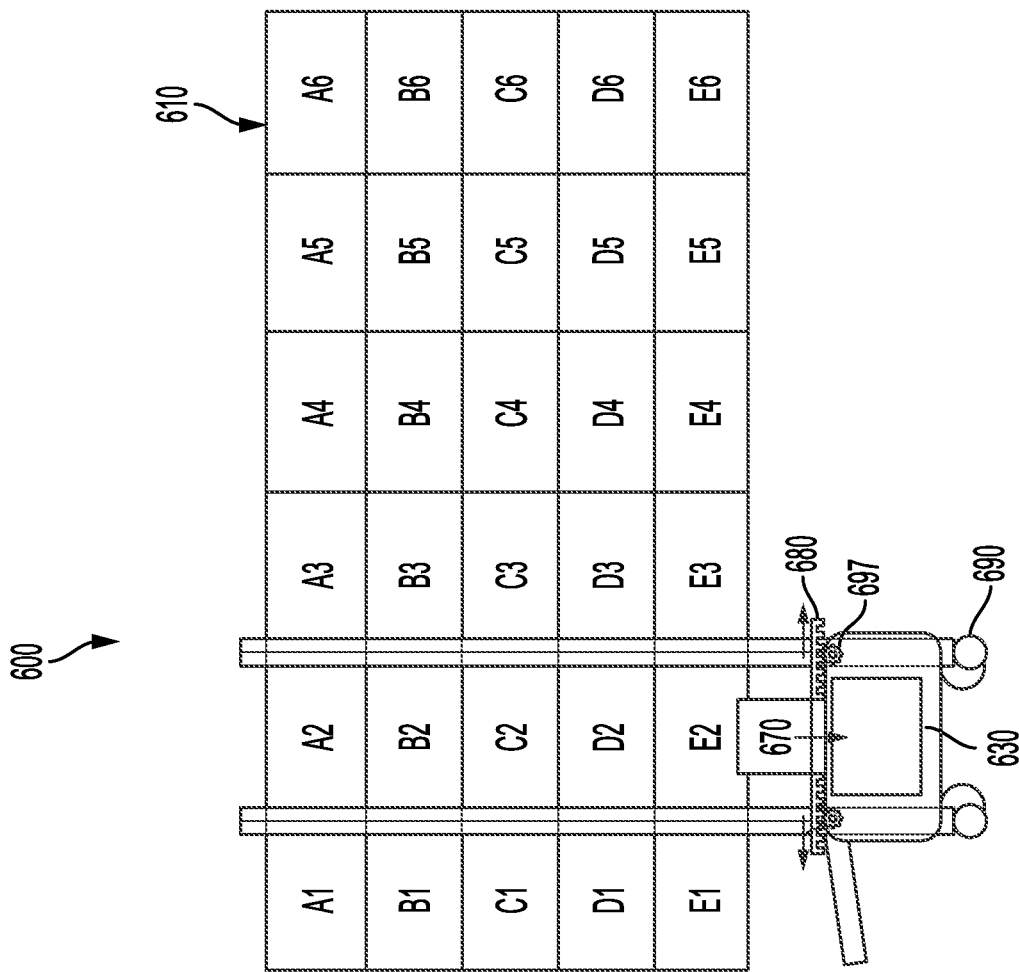

FIGS. 6A-6D are diagrams of rear and side views of an example of a smart locker automated transfer system 600 using a rack and rail mechanism in accordance with embodiments of this disclosure. FIG. 6A is a diagram of a rear view example of the smart locker automated transfer system 600 transferring a package to a rail base plate of a rack and rail mechanism. FIG. 6B is a diagram of a side view the example shown in FIG. 6A. FIG. 6C is a diagram of a rear view example of the smart locker automated transfer system 600 transferring the package to an autonomous delivery robot. The autonomous delivery robot may be an autonomous vehicle, such as vehicle 1000 shown in FIG. 1. FIG. 6D is a diagram of a side view of the example shown in FIG. 6C.

As shown in FIG. 6A, the smart locker automated transfer system 600 includes a locker system 610. The locker system 610 includes stacked lockers A1-E6 arranged in a grid. Each locker A1-E6 may be a retractable base plate. The smart locker automated transfer system 600 includes a rack and rail system 620 and an autonomous delivery robot 630.

Each of the lockers A1-E6 include a front side and a rear side. The front side may be used for loading packages into the locker, and the rear side may be used for unloading packages to transfer to the autonomous delivery robot 630. Humans do not have access to the rear side, therefore delivery from the locker to the customer may be performed autonomously. Each of the lockers A1-E6 include a retractable base plate 640. When a package is loaded into the locker, the package is placed on the retractable base plate 640. The retractable base plate 640 is configured to eject out of a locker, for example locker B2, using a rack and pinion mechanism 650. The retractable base plate 640 includes a second set of pinions 660 to transfer a package, such as package 670, to a rail base plate 680 of the rack and rail system 620. The second set of pinions 660 is positioned in a perpendicular direction along a same plane relative to the rack and pinion mechanism 650. The second set of pinions 660 is configured to move each half of the retractable base plate 640 outward such that the package 670 is transferred to the rail base plate 680 through the opening created by the outward movement of the two halves of the retractable base plate 640. The pinions are actuated by electrical motors. The rotation speed of the electrical motors may be electronically controlled. The retractable base plate 640 may include mechanical stoppers (not shown) to prevent the package 670 from sliding and to ensure proper placement of the package 670 on the rail base plate 680.

The rack and rail system 620 includes two or more sets of parallel bars that may be aligned horizontally with any column of lockers, for example lockers A2-E2 as shown in FIGS. 6A and 6C. The horizontal movement may be achieved through wheels 690 provided at the base of each of the parallel bars. The wheels 690 are configured to roll on guide rails 692. The rack and rail system 620 includes the rail base plate 680 which is attached to the parallel bars. The rail base plate 680 is configured with a hydraulic lift mechanism 695 that is configured to move the vertical position of the rail base plate 680 and properly align the rail base plate 680 with a locker to receive the package from the retractable base plate 640. The rail base plate 680 includes a rack and pinion mechanism 697 to transfer a package, such as package 670, to the autonomous delivery robot 630. The pinions of the rack and pinion mechanism 697 are configured to move each half of the rail base plate 680 outward such that the package 670 is transferred to the autonomous delivery robot 630 through the opening created by the outward movement of the two halves of the rail base plate 680. The pinions are actuated by electrical motors. The rotation speed of the electrical motors may be electronically controlled. The rail base plate 680 may include mechanical stoppers (not shown) to prevent the package 670 from sliding and to ensure proper placement of the package 670 into the autonomous delivery robot 630.

In the example shown in FIGS. 6A-6D, the smart locker automated transfer system 600 is configured to automatically transfer packages from the lockers A1-E6 to the autonomous delivery robot 630. In an example, the smart locker automated transfer system 600 may receive an indication to retrieve a package 670 from locker B2. The indication may include a locker identifier (ID), an order number, a package ID, customer information, or any combination thereof. The smart locker automated transfer system 600 is configured to align the rack and rail system 620 with the locker indicated in the locker ID, in this example, locker B2. The smart locker automated transfer system 600 is configured to transmit a delivery message to the autonomous delivery robot 630. The delivery message may include a destination address and information associated with the package. The information associated with the package may include the locker ID, rack and rail ID, rack and rail location, package details, or any combination thereof. The package details may include a package size, package weight, package restrictions, package contents, or any combination thereof. The autonomous delivery robot 630, in response to the delivery message, is configured to traverse to the rack and rail system 620 and park at a designated location that is aligned with the position of the rail base plate 680. The storage compartment of the autonomous delivery robot 630 may be configurable based on the package 670.

Locker B2 may receive a request to unlock. In response to the request, the locker B2 opens the rear side. The retractable base plate 640 may then eject from the locker B2, as shown in FIG. 6B, onto the rail base plate 680. The retractable base plate 640 may then transfer package 670 to the rail base plate 680 using the second set of pinions 660 as described above and shown in FIG. 6A. The rail base plate 680 and the package 670 are then lowered down using the hydraulic mechanism 695 as shown in FIG. 6D. The rail base plate 680 may then transfer the package 670 to the autonomous delivery robot 630 using the rack and pinion mechanism 697 as described above and shown in FIG. 6C.

Figure 7:
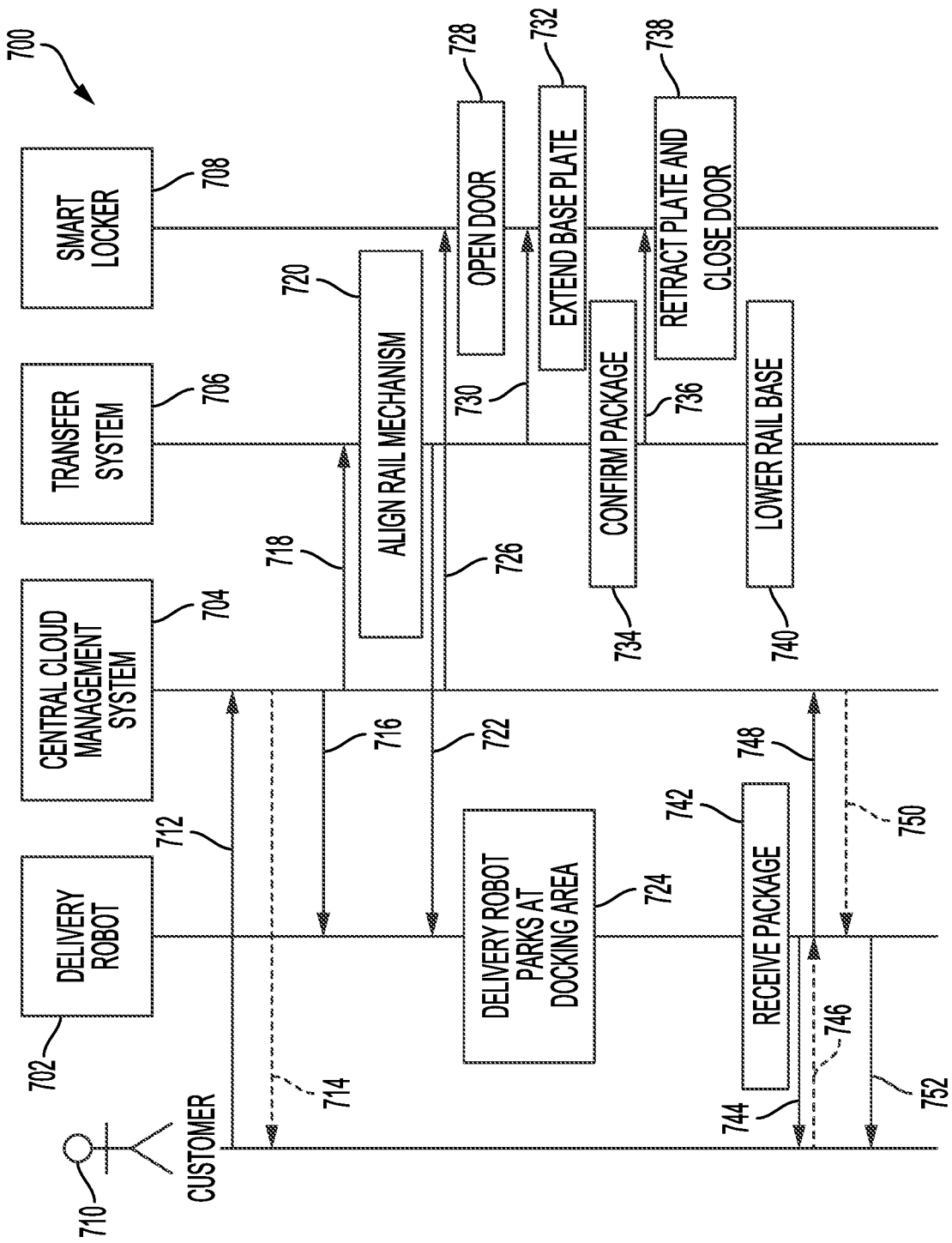
FIG. 7 is a flow diagram of an example of a smart locker automated transfer system in accordance with embodiments of this disclosure.

FIG. 7 is a flow diagram of an example of a smart locker automated transfer system 700 in accordance with embodiments of this disclosure. As shown in FIG. 7, the smart locker automated transfer system 700 includes an autonomous delivery robot 702, a cloud management system 704, a transfer system 706, and a smart locker 708. The autonomous delivery robot 702 may be an autonomous vehicle, such as vehicle 1000 shown in FIG. 1. In this example, the transfer system 706 may be a rack and rail system such as the rack and rail system 620 shown in FIGS. 6A-6D. A customer 710, also referred to as a user, may interact with the smart locker automated transfer system using a personal device such as a smart phone, tablet, personal computer, voice-activated assistant, or wearable device. When the customer 710 receives an indication that a package has been delivered to the smart locker 708, the customer may transmit a package pickup request 712 using an application on the personal device. The package pickup request 712 includes a destination address, customer authentication information, order information, package size, package weight, package restrictions, package contents, or any combination thereof.

The cloud management system 704 is configured to receive the package pickup request 712. In response, the cloud management system 704 is configured to determine an estimated delivery time. The estimated delivery time may be determined based on a customer location, traffic conditions, weather conditions, a time to load the autonomous delivery robot, or any combination thereof. The cloud management system 704 is configured to transmit a delivery message 714 to the customer 710. The delivery message 710 may include the determined estimated delivery time, a secure code, or both. The secure code may be a one-time code that is used by the customer 710 to complete the delivery. For example, when the autonomous delivery robot arrives at the destination, the customer 710 may receive an alert via the application on the personal device. The alert may prompt the customer 710 to enter the secure code to unlock the autonomous delivery robot storage compartment in order to retrieve the packages and complete delivery.

The cloud management system 704 is configured to transmit a delivery message 716 to the autonomous delivery robot 702. The delivery message 716 may include the destination address and information associated with the package. The information associated with the package may include a locker ID, rack and rail ID, rack and rail location, package details, or any combination thereof. The package details may include a package size, package weight, package restrictions, package contents, or any combination thereof. The cloud management system 704 is configured to transmit a message 718 to the transfer system 706. The message 718 may include the locker ID, information associated with the package, or both. The locker ID indicates a locker associated with the package pickup request.

In response to receiving the message 718, the transfer system 706 is configured to align 720 the rack and rail mechanism with the indicated locker. In this example, the indicated locker is the smart locker 708. When the transfer system 706 is aligned with the indicated locker, the transfer system 706 is configured to transmit a message 722 to the autonomous delivery robot 702. The message 722 indicates that the transfer system 706 is in place and is ready to dock the autonomous delivery robot 702.

The autonomous delivery robot 702 is configured to receive the message 722 and traverse to the transfer system 706. The autonomous delivery robot 702 is configured to dock 724 in a manner to allow the transfer system 706 to transfer a package into the storage compartment of the autonomous delivery robot 702.

The cloud management system 704 is configured to transmit an unlock request message 726 to the smart locker 708. The smart locker 708 is configured to receive the unlock request message 726 and open the door 728. In some examples, the transfer system 706 may transmit a retractable base plate extension request 730 to the smart locker. The retractable base plate extension request 730 may be transmitted based on a confirmation that the locker door is open and that the transfer system 706 is in place and ready to transfer the package. The smart locker 708 is configured to extend the base plate 732 and transfer the package to the rail base plate of the transfer system 706 as described above. The transfer system 706 may confirm receipt of the package 734 and transmit a retractable base plate retraction request 736. The smart locker 708 is configured to receive the retractable base plate retraction request 736 and, in response, retract 738 the retractable base plate into the smart locker 708 and close the locker door. The transfer system 706 is configured to lower 740 the rail base plate to the autonomous delivery robot 702 and transfer the package to the storage compartment of the autonomous delivery robot 702 as described above.

The autonomous delivery robot 702 is configured to receive the package 742 from the transfer system 706 and traverse to the destination. Upon arrival at the destination, the autonomous delivery robot 702 is configured to transmit an authentication request 744 to the personal device of the customer 710. The autonomous delivery robot 702 is configured to receive an authentication message 746 from the personal device of the customer 710. In some examples, the autonomous delivery robot 702 may transmit a confirmation request 748 to the cloud management system 704. The cloud management system 704 may be configured to authenticate the customer 710 based on the information in the authentication message 746. If the information in the authentication message 746 matches the secure code or any other authentication criteria in the delivery message 714, the cloud management system 704 transmits a confirmation message 750 to the autonomous delivery robot 702. The autonomous delivery robot 702 is configured to receive the confirmation message 750 and unlock the storage compartment for package retrieval 752. In some embodiments, the customer authentication may be performed by the autonomous delivery robot 702 without the use of the cloud management system 704.

Figure 8:
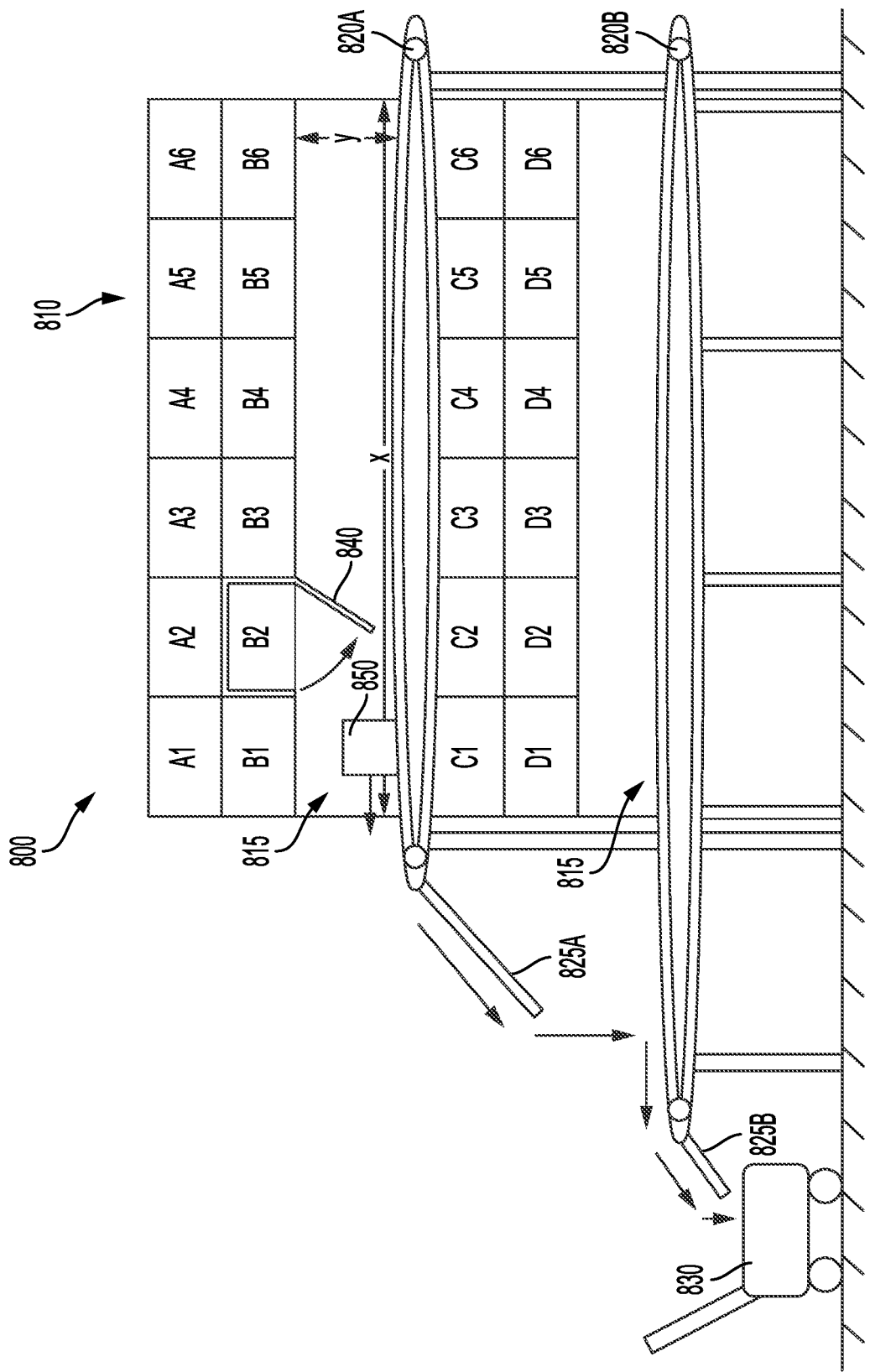
FIG. 8 is a diagram of an example of a smart locker automated transfer system using a conveyor belt mechanism in accordance with embodiments of this disclosure.

FIG. 8 is a diagram of an example of a smart locker automated transfer system 800 using a conveyor belt mechanism in accordance with embodiments of this disclosure. As shown in FIG. 8, the smart locker automated transfer system 800 includes a locker system 810. The locker system 810 includes stacked lockers A1-D6 arranged in a grid. Each locker A1-D6 may be a retractable smart locker. As shown in FIG. 8, the grid contains a space 815 that is devoid of lockers. The dimensions of the space 815 are shown as x and y. The smart locker automated transfer system 800 includes one or more conveyor belt mechanisms, shown as 820A and 820B, and an autonomous delivery robot 830. The autonomous delivery robot 830 may be an autonomous vehicle, such as vehicle 1000 shown in FIG. 1.

Each of the lockers A1-D6 include a front side and a rear side. The front side may be used for loading packages into the locker, and the rear side may be used for unloading packages to transfer to the autonomous delivery robot 830. Humans do not have access to the rear side, therefore delivery from the locker to the customer may be performed autonomously. Each of the lockers A1-D6 are retractable smart lockers. Using a rack and pinion mechanism, each retractable locker is configured to extend out of the locker system 810 and over a conveyor belt mechanism such as conveyor belt mechanism 820A or 820B. Each of the lockers A1-D6 includes a base door 840 that is controlled by an electric motor. The base door 840 may be hinged, as shown in FIG. 8, to transfer a package 850 to the conveyor belt 820A or 820B or may use a rack and pinion mechanism to transfer the package 850 to the conveyor belt 820A or 820B. Once the locker has been extended, the base door 840 may open such that the package 850 is transferred onto the conveyor belt mechanism 820A or 820B.

The conveyor belt mechanisms 820A and 820B run parallel to the locker system 810. A conveyor belt mechanism may be installed parallel to the bottom of every space 815 in the locker grid. The space 815 is configured such that when a locker extends from the grid and opens the base door 840, the contents of the locker will fall onto the conveyor belt without the extended locker colliding with the conveyor belt. As shown in FIG. 8, a series of conveyor belt mechanisms 820A and 820B are shown to reduce the drop height of the packages. In this example, two conveyor belt mechanisms are shown for simplicity, and it is understood that any number of conveyor belt mechanisms may be implemented.

As shown in FIG. 8, once the package 850 is transferred to the conveyor belt mechanism 820A, the package 850 moves towards the autonomous delivery robot 830. As the package 850 reaches the edge of the conveyor belt mechanism 820A, it will slide through a chute 825A onto the conveyor belt mechanism 820B. Once the package 850 reaches the edge of the lowest level conveyor belt, in this example conveyor belt mechanism 820B, the package 850 will slide through chute 825B and into the autonomous delivery robot 830, which is parked at the designated location with its lid to the storage compartment open.

In the example shown in FIG. 8, the smart locker automated transfer system 800 is configured to automatically transfer packages from the lockers A1-D6 to the autonomous delivery robot 830. In an example, the smart locker automated transfer system 800 may receive an indication to retrieve a package 850 from locker B2. The indication may include a locker ID, an order number, a package ID, customer information, or any combination thereof. The smart locker automated transfer system 800 is configured to transmit a delivery message to the autonomous delivery robot 830. The delivery message may include a destination address and information associated with the package. The information associated with the package may include the locker ID, conveyor belt mechanism ID, conveyor belt mechanism location, package details, docking information, or any combination thereof. The package details may include a package size, package weight, package restrictions, package contents, or any combination thereof. The autonomous delivery robot 830, in response to the delivery message, is configured to traverse to the conveyor belt mechanism 820B and park at a designated location that is aligned with the chute 825B.

Locker B2 may receive a request to unlock. In response to the request, the locker B2 may extend from the grid and over the conveyor belt mechanism 820A. The locker B2 may then transfer package 850 to the conveyor belt mechanism 820A by opening the base door 840. As the package 850 reaches the edge of the conveyor belt mechanism 820A, it will slide through a chute 825A onto the conveyor belt mechanism 820B. Once the package 850 reaches the edge of the lowest level conveyor belt, in this example conveyor belt mechanism 820B, the package 850 will slide through chute 825B and into the autonomous delivery robot 830, which is parked at the designated location with its lid to the storage compartment open.

FIG. 9A is a diagram of a side view of an example of a package transfer using a smart locker automated transfer system with a conveyor belt mechanism in accordance with embodiments of this disclosure. The smart locker automated transfer system shown in FIG. 9A includes a locker system 910 and a conveyor belt mechanism 920. As shown in FIG. 9A, locker B2 is configured with a rack and pinion mechanism 930 that is configured to extend the locker over the conveyor belt mechanism 920. Once the package has been deposited on the conveyor belt mechanism 920, the locker may retract back into the grid using the rack and pinion mechanism 930.

FIG. 9B is a diagram of a rear view of an example of a package transfer using a smart locker automated transfer system with a conveyor belt mechanism in accordance with embodiments of this disclosure. In this example, locker B2 is extended over the conveyor belt mechanism 920. The locker B2 is configured to open base door 940 to deposit the package 950 onto the conveyor belt mechanism 920.

Figure 10:
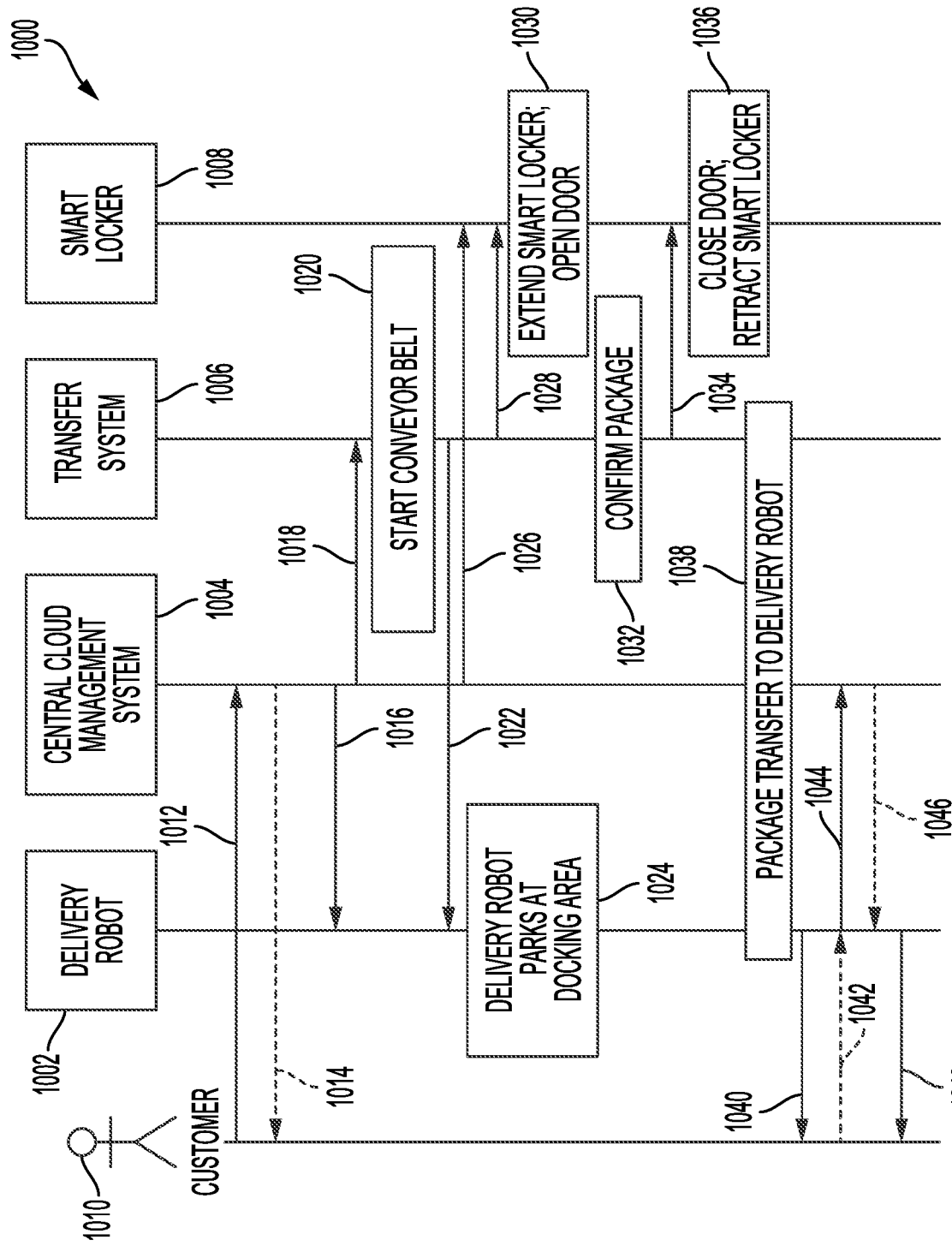
FIG. 10 is a flow diagram of another example of a smart locker automated transfer system in accordance with embodiments of this disclosure.

FIG. 10 is a flow diagram of another example of a smart locker automated transfer system 1000 in accordance with embodiments of this disclosure. As shown in FIG. 10, the smart locker automated transfer system 1000 includes an autonomous delivery robot 1002, a cloud management system 1004, a transfer system 1006, and a smart locker 1008. The autonomous delivery robot 1002 may be an autonomous vehicle, such as vehicle 1000 shown in FIG. 1. In this example, the transfer system 1006 may be a conveyor belt mechanism such as the conveyor belt mechanisms 820A and 820B shown in FIG. 8. A customer 1010, also referred to as a user, may interact with the smart locker automated transfer system using a personal device such as a smart phone, tablet, personal computer, voice-activated assistant, or wearable device. When the customer 1010 receives an indication that a package has been delivered to the smart locker 1008, the customer may transmit a package pickup request 1012 using an application on the personal device. The package pickup request 1012 includes a destination address, customer authentication information, order information, package size, package weight, package restrictions, package contents, or any combination thereof.

The cloud management system 1004 is configured to receive the package pickup request 1012. In response, the cloud management system 1004 is configured to determine an estimated delivery time. The estimated delivery time may be determined based on a customer location, traffic conditions, weather conditions, a time to load the autonomous delivery robot, or any combination thereof. The cloud management system 1004 is configured to transmit a delivery message 1014 to the customer 1010. The delivery message 1014 may include the determined estimated delivery time, a secure code, or both. The secure code may be a one-time code that is used by the customer 1010 to complete the delivery. For example, when the autonomous delivery robot arrives at the destination, the customer 1010 may receive an alert via the application on the personal device. The alert may prompt the customer 1010 to enter the secure code to unlock the autonomous delivery robot storage compartment in order to retrieve the packages and complete delivery.

The cloud management system 1004 is configured to transmit a delivery message 1016 to the autonomous delivery robot 1002. The delivery message 1016 may include the destination address and information associated with the package. The information associated with the package may include a locker ID, conveyor belt ID, conveyor belt location, package details, or any combination thereof. The package details may include a package size, package weight, package restrictions, package contents, or any combination thereof. The cloud management system 1004 is configured to transmit a message 1018 to the transfer system 1006. The message 1018 may include the locker ID, information associated with the package, or both. The locker ID indicates a locker associated with the package pickup request.

In response to receiving the message 1018, the transfer system 1006 is configured to start 1020 the conveyor belt mechanism. In this example, the indicated locker is the smart locker 1008. The transfer system 1006 is configured to transmit a message 1022 to the autonomous delivery robot 1002. The message 1022 indicates that the transfer system 1006 is ready to dock the autonomous delivery robot 1002.

The autonomous delivery robot 1002 is configured to receive the message 1022 and traverse to the transfer system 1006. The autonomous delivery robot 1002 is configured to dock 1024 in a manner to allow the transfer system 1006 to transfer a package into the storage compartment of the autonomous delivery robot 1002.

The cloud management system 1004 is configured to transmit an activation request message 1026 to the smart locker 1008. The smart locker 1008 is configured to receive the activation request message 1026. In some examples, the transfer system may confirm that the autonomous delivery robot is ready to accept the package and transmit a confirmation message 1028 to the smart locker. Upon receipt of the activation request message, the confirmation message 1028, or both, the smart locker 1008 is configured to extend 1030 from the grid over the conveyor belt mechanism and open the base door to deposit the package on the conveyor belt mechanism. The transfer system 1006 may confirm receipt of the package 1032 and transmit a confirmation message 1034. The smart locker 1008 is configured to receive the confirmation message 1034 and, in response, close 1036 the base door and retract back into the grid. The transfer system 1006 is configured to transport 1038 the package using one or more conveyor belt mechanisms to the autonomous delivery robot 1002 and transfer the package to the storage compartment of the autonomous delivery robot 1002 as described above.

The autonomous delivery robot 1002 is configured to receive the package from the transfer system 1006 and traverse to the destination. Upon arrival at the destination, the autonomous delivery robot 1002 is configured to transmit an authentication request 1040 to the personal device of the customer 1010. The autonomous delivery robot 1002 is configured to receive an authentication message 1042 from the personal device of the customer 1010. In some examples, the autonomous delivery robot 1002 may transmit a confirmation request 1044 to the cloud management system 1004. The cloud management system 1004 may be configured to authenticate the customer 1010 based on the information in the authentication message 1042. If the information in the authentication message 1042 matches the secure code or any other authentication criteria in the delivery message 1014, the cloud management system 1004 transmits a confirmation message 1046 to the autonomous delivery robot 1002. The autonomous delivery robot 1002 is configured to receive the confirmation message 1046 and unlock the storage compartment for package retrieval 1048. In some embodiments, the customer authentication may be performed by the autonomous delivery robot 1002 without the use of the cloud management system 1004.

Figure 11:
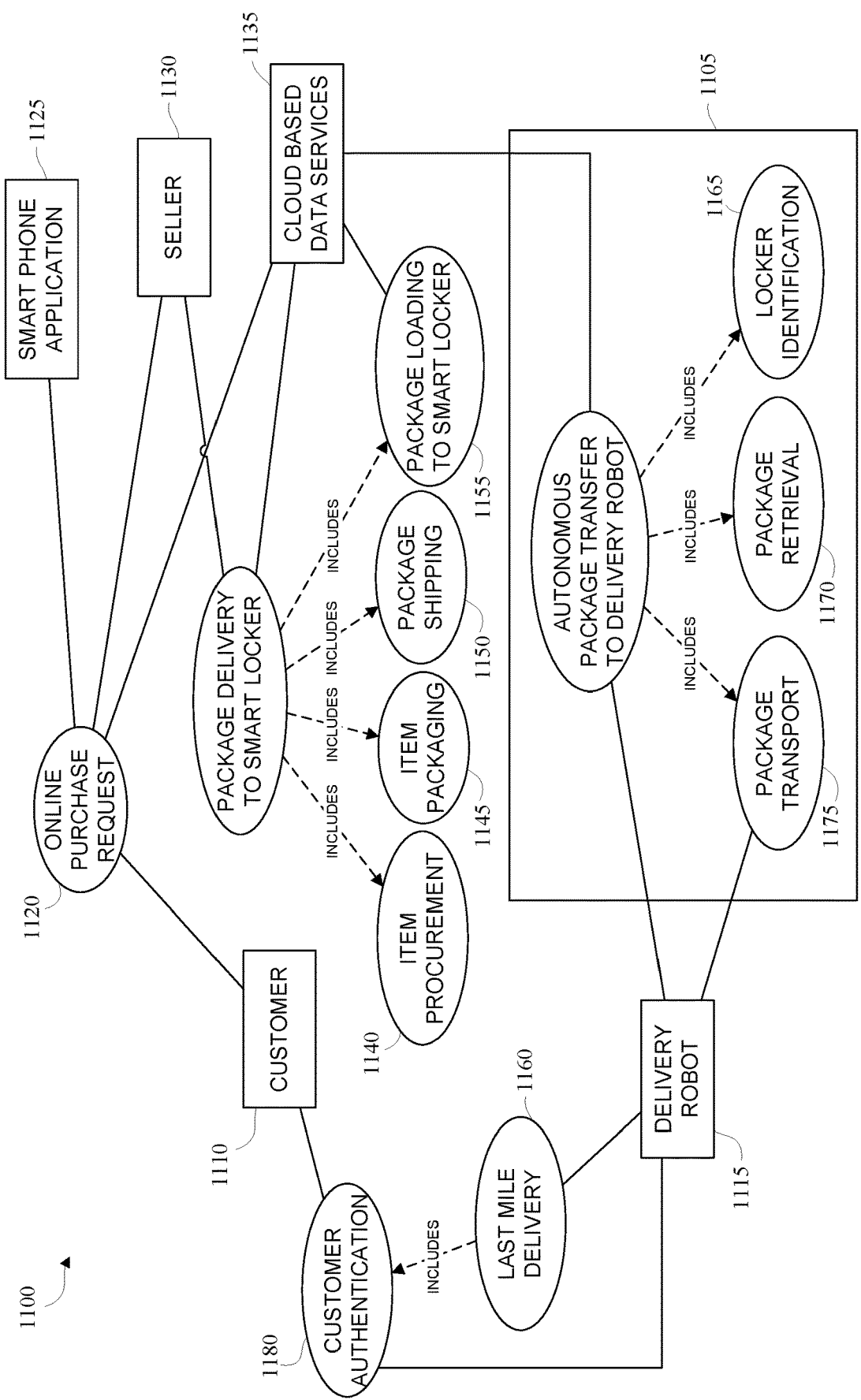
FIG. 11 is a diagram of an example of a use case for one or more of the embodiments disclosed herein.

FIG. 11 is a diagram of an example of a use case 1100 for one or more of the embodiments disclosed herein. The use case 1100 illustrates how a smart locker automated transfer system 1105 communicates with other systems to enable a customer 1110 to place an online order and receive the package delivered by an autonomous delivery robot 1115.

As shown in FIG. 11, the customer 1110 may place an online purchase request 1120. The online purchase request 1120 may be performed using a smart phone application 1125. The seller 1130 may be notified of the online purchase request 1120 via the cloud based data services 1135. The seller 1130 may procure 1140 the requested item and package 1145 the requested item. The seller 1130 may then ship 1150 the package to an appointed smart locker service provider in the destination area of the customer 1110, for example, the smart locker automated transfer system 1105.

The smart locker service provider staff may manually load the package 1155 from the seller to an assigned smart locker. The last mile delivery 1160 to the customer 1110 in the smart locker automated transfer system 1105 may be performed using the autonomous delivery robot 1115. Once the package is safely stored in the smart locker, the autonomous delivery robot 1115 responsible for the delivery of the package is sent to the smart locker location. The autonomous delivery robot then parks at a designated area near the smart locker automated transfer system 1105 and opens its lid.

The smart locker automated transfer system 1105 identifies 1165 the smart locker containing the package for delivery. The package may then be retrieved 1170 using one or more of the embodiments disclosed herein. The package may then be transported 1175 to the parked autonomous delivery robot 1115. The package is then dropped into the containment unit of the autonomous delivery robot 1115. Upon confirmation of safe receipt of the package, the autonomous delivery robot 1115 may close its lid.

The autonomous delivery robot 1115 containing the package will then autonomously travel to the drop off location, for example the delivery address of the customer 1110. Once the autonomous delivery robot 1115 reaches the location of the customer 1110, the smart phone application 1125 may notify the customer of the arrival of the autonomous delivery robot 1115. The customer 1110 may then approach the autonomous delivery robot 1115. The autonomous delivery robot 1115 may then perform customer authentication 1180 using a code that is shared with the customer 1110 through the smart phone application 1125. Once the customer 1110 has been authenticated, the autonomous delivery robot 1115 will open its lid, thus allowing the customer 1110 to pick up the package.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A smart locker automated transfer system comprising: a plurality of lockers, wherein each locker of the plurality of lockers comprises:
    a first side configured for loading a package,
    a second side configured for unloading the package, and
    a retractable base plate configured to hold the package;
a transfer system comprising:
    at least two sets of parallel bars configured to move horizontally along a plurality of guide rails to align with a locker, and
    a rail base plate configured to receive the package from the retractable base plate, wherein the rail base plate is attached to the at least two sets of parallel bars via a hydraulic lift mechanism, wherein the hydraulic lift mechanism is configured to align the rail base plate vertically with the locker; and
an autonomous delivery robot configured to receive the package from the rail base plate and deliver the package to a destination.

2. The smart locker automated transfer system of claim 1, wherein the retractable base plate comprises a first rack and pinion mechanism configured to extend the retractable base plate from the locker and retract the retractable base plate into the locker.

3. The smart locker automated transfer system of claim 2, wherein the retractable base plate comprises a second rack and pinion mechanism configured to transfer the package to the rail base plate.

4. The smart locker automated transfer system of claim 3, wherein the second rack and pinion mechanism is positioned in a perpendicular direction along a same plane relative to the first rack and pinion mechanism.

5. The smart locker automated transfer system of claim 1, further comprising a cloud management system configured to:
    receive a package pickup request; and
    transmit a locker identifier (ID) to the transfer system, wherein the locker ID indicates a locker associated with the package pickup request.

6. The smart locker automated transfer system of claim 5, wherein the cloud management system is further configured to:
    determine an estimated delivery time; and
    transmit the estimated delivery time to a user.

7. The smart locker automated transfer system of claim 6, wherein the estimated delivery time is determined based on one or more of a user location, traffic conditions, weather conditions, and a time to load the autonomous delivery robot.

8. The smart locker automated transfer system of claim 5, wherein the cloud management system is further configured to transmit a delivery destination to the autonomous delivery robot.

9. The smart locker automated transfer system of claim 8, wherein the cloud management system is further configured to transmit information associated with a package pickup to the autonomous delivery robot.

10. The smart locker automated transfer system of claim 5, wherein the transfer system is configured to:
    receive the locker ID, wherein the locker ID indicates the locker associated with the package pickup request; and
    align the rail mechanism with the indicated locker in response to receiving the locker ID.

11. The smart locker automated transfer system of claim 10, wherein the locker associated with the package pickup request is configured to:
    receive an unlock request from the cloud management system;
    open the second side in response to the unlock request;

extend the retractable base plate to transfer the package; and retract the base plate based on a confirmation of a successful transfer to the rail base plate.

12. The smart locker automated transfer system of claim 1, wherein the rail base plate is configured to transfer the package to the autonomous delivery robot.

13. The smart locker automated transfer system of claim 1, wherein the autonomous delivery robot is configured to receive a delivery destination and information associated with a package pickup.

14. The smart locker automated transfer system of claim 13, wherein the autonomous delivery robot is configured to park in a docking area based on the information associated with the package pickup.

15. The smart locker automated transfer system of claim 14, wherein the autonomous delivery robot is configured to:
receive the package from the rail base plate;
traverse to the delivery destination;
transmit an authentication request to a customer;
receive an authentication response from the customer; and
on a condition that the authentication response matches an identifier associated with the package, deliver the package to the customer.

16. A smart locker automated transfer system comprising:
a plurality of lockers, wherein each locker of the plurality of lockers comprises:
a first side configured for loading a package,
a second side configured for unloading the package, and
a retractable smart locker configured to hold the package;
a transfer system comprising a conveyor belt; and
an autonomous delivery robot configured to receive the package from the conveyor belt and deliver the package to a destination.

17. The smart locker automated transfer system of claim 16, further comprising a cloud management system configured to:
receive a package pickup request; and
transmit a locker identifier (ID) to the transfer system, wherein the locker ID indicates a locker associated with the package pickup request.

18. The smart locker automated transfer system of claim 17, wherein the transfer system is configured to:
receive the locker ID, wherein the locker ID indicates the locker associated with the package pickup request; and
start the conveyor belt in response to receiving the locker ID.

19. The smart locker automated transfer system of claim 18, wherein the locker associated with the package pickup request is configured to:
receive an unlock request from the cloud management system; and
open the second side in response to the unlock request to transfer the package to the conveyor belt.

20. The smart locker automated transfer system of claim 19, wherein the autonomous delivery robot is configured to:
receive the package from the conveyor belt;
traverse to the delivery destination;
transmit an authentication request to a customer;
receive an authentication response from the customer; and
on a condition that the authentication response matches an identifier associated with the package, deliver the package to the customer.

* * * * *